May 29, 1928. 1,671,453
H. STIER
METAL TRUCK
Filed June 2, 1927
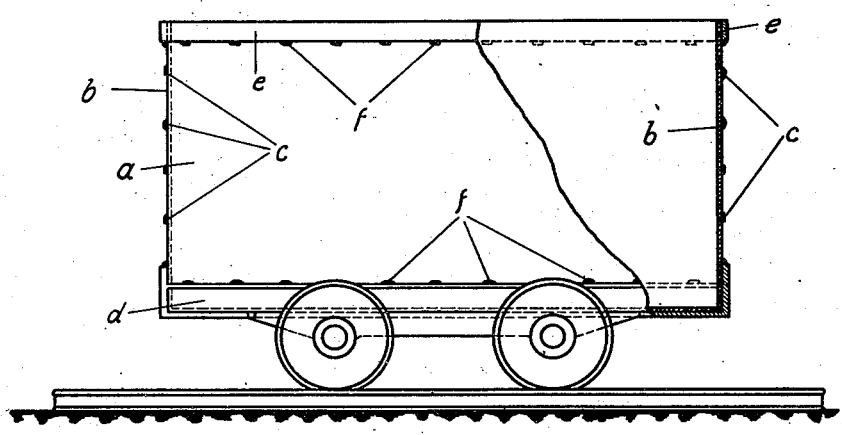
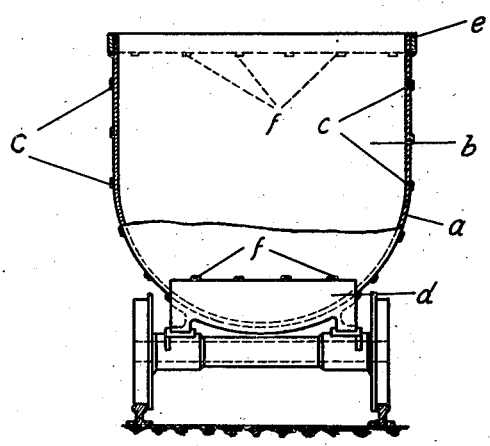

Patented May 29, 1928.

1,671,453

UNITED STATES PATENT OFFICE.

HERMANN STIER, OF HERNE, GERMANY.

METAL TRUCK.

Application filed June 2, 1927, Serial No. 196,048, and in Germany March 22, 1926.

Metal trucks made of zinc-coated iron are generally built up of plates joined by brackets and rivets. The plates must be perforated for the rivets, and when the heated rivets are inserted they are liable to melt the zinc, and rusting subsequently occurs. The perforation weakens both the plates and the brackets, and the rivet-head interferes with the cleaning of the truck. Autogenous welding has been proposed as a substitute, but the heating was found to cause such distortion that the stresses set up caused the joints to give way.

According to this invention a truck is built up of an approximately U-shaped zinc-coated plate or plates, and end or head plates, joined to each other by welding at intervals along their edges, and at the welded parts, where the zinc as been melted away, a fresh zinc coating is applied by spraying. By welding as described, joints fully equal in strength to riveted joints are obtainable, and it is nevertheless not too difficult to disassemble the parts when renewal of a plate or plates is required. The zinc coating is continuous, so that no patches of iron are exposed to rusting. The welding, performed electrically, is generally performed wholly on the outside, leaving the inside smooth, so that it is easy to clean.

A truck constructed according to the invention is shown in the annexed drawings, in which Fig. 1 is a side elevation, partly in section, and Fig. 2 a cross section.

The U-shaped plate or sheet $a$ is joined to two flanged head plates $b$ by joints produced by welding at intervals only, as indicated at $c, c$, the intervals being approximately equal to those generally existing between the rivets heretofore used for this class of work. At these parts $c$ the joints are sprayed with zinc, after the welding.

The connection to the underframe $d$ is similarly made by welded joints $f, f$, as is the attachment of the reinforcing rim piece $e$ at the top.

Having now particularly described and ascertained the nature of said invention and in what manner the same is to be performed, I declare that what I claim is:—

A metal truck consisting of an approximately U-shaped zinc coated plate or plates, with zinc coated end or head plates, the said plates being joined to each other by electrically welded joints made at intervals along their edges, and the welded parts being coated with zinc sprayed thereon.

In testimony whereof I affix my signature.

HERMANN STIER.